Nov. 20, 1951     A. H. CROUCHER     2,575,864
LET DOWN TYPE, RIGID TOP
Filed July 13, 1948     6 Sheets-Sheet 1
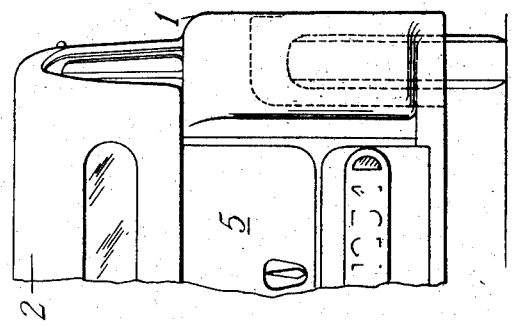
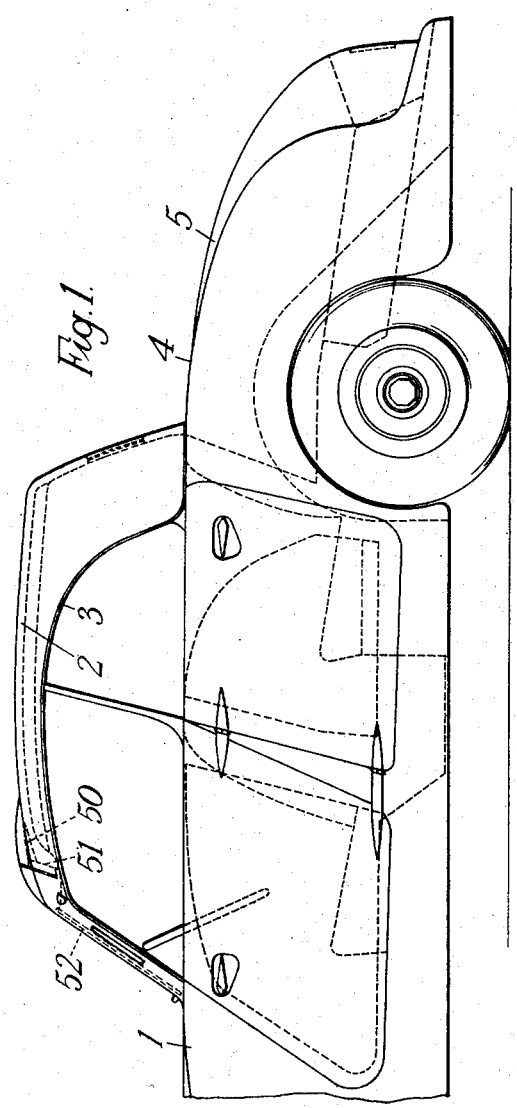
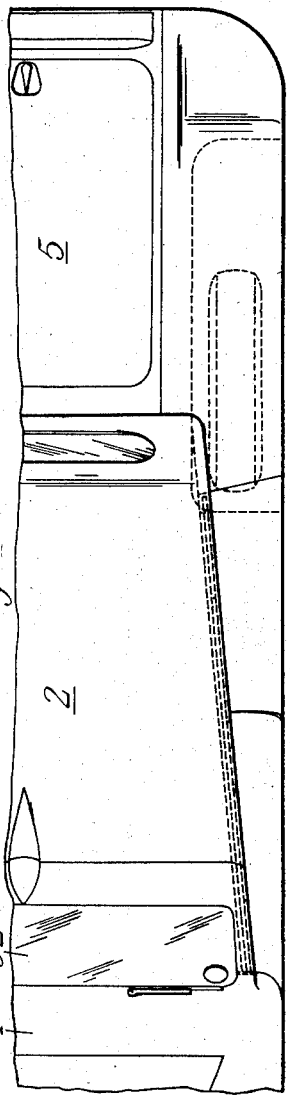
ANTONY H. CROUCHER
BY Hall & Houghton
ATTORNEYS Nov. 20, 1951 — A. H. CROUCHER — 2,575,864
LET DOWN TYPE RIGID TOP
Filed July 13, 1948 — 6 Sheets-Sheet 2
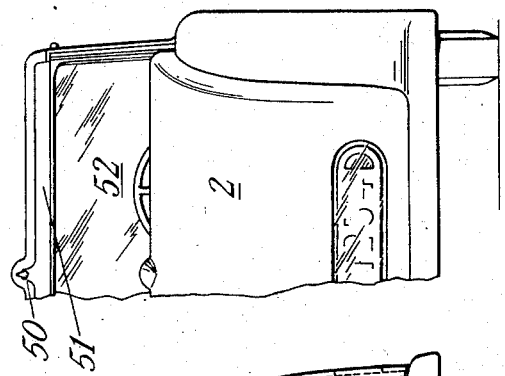
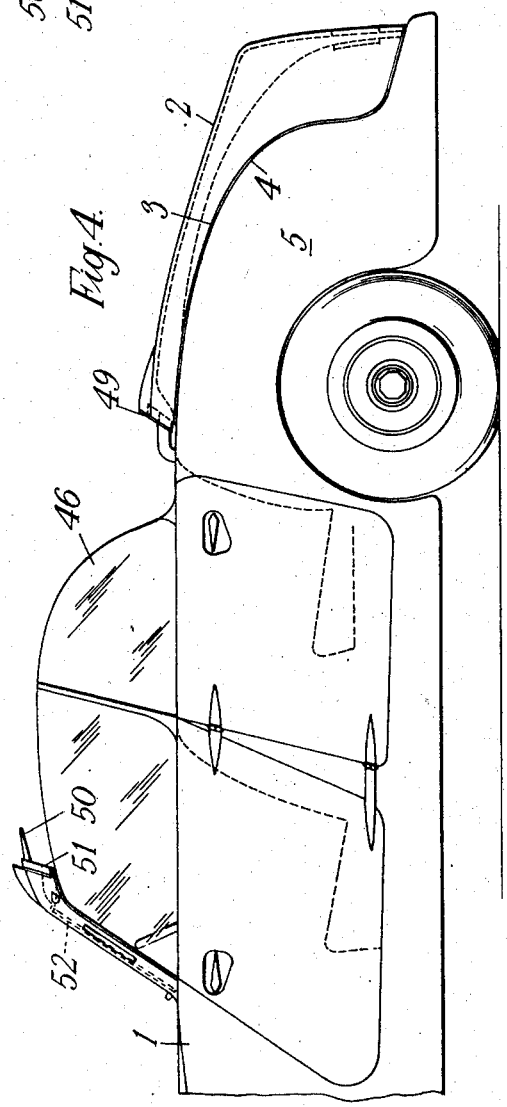
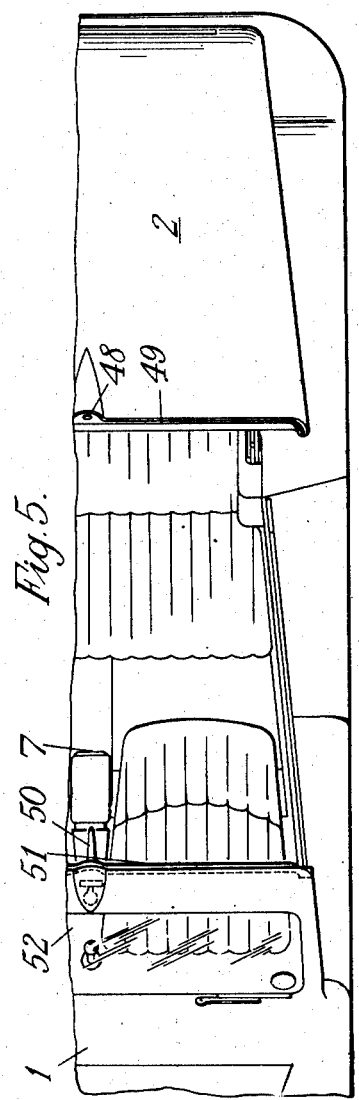
ANTONY H. CROUCHER
BY Hall & Houghton
ATTORNEYS Nov. 20, 1951     A. H. CROUCHER     2,575,864
LET DOWN TYPE RIGID TOP
Filed July 13, 1948     6 Sheets-Sheet 3
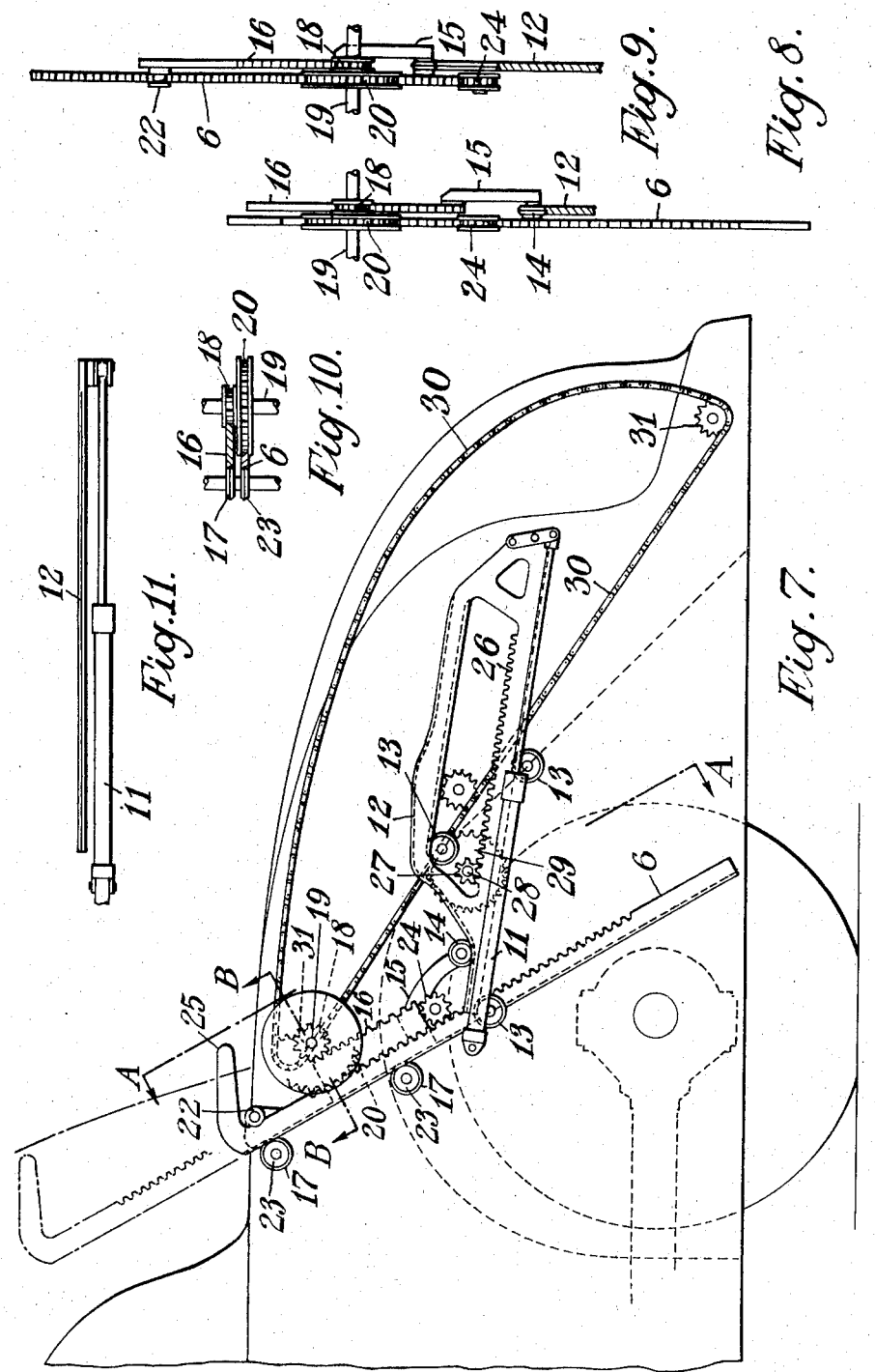
ANTONY H. CROUCHER
BY Hall & Houghton
ATTORNEYS Nov. 20, 1951 A. H. CROUCHER 2,575,864
LET DOWN TYPE RIGID TOP
Filed July 13, 1948 6 Sheets-Sheet 4

ANTONY H. CROUCHER
BY Hall & Houghton
ATTORNEYS

Nov. 20, 1951  A. H. CROUCHER  2,575,864
LET DOWN TYPE RIGID TOP

Filed July 13, 1948  6 Sheets-Sheet 5

ANTONY H. CROUCHER
BY Hall & Houghton
ATTORNEYS

Nov. 20, 1951　　　A. H. CROUCHER　　　2,575,864
LET DOWN TYPE RIGID TOP
Filed July 13, 1948　　　　　　　　　　　6 Sheets-Sheet 6

ANTONY H. CROUCHER
BY Hall & Houghton
ATTORNEYS

Patented Nov. 20, 1951

2,575,864

UNITED STATES PATENT OFFICE 2,575,864

LET-DOWN TYPE RIGID TOP

Antony H. Croucher, Esher, England

Application July 13, 1948, Serial No. 38,440
In Great Britain July 15, 1947

8 Claims. (Cl. 296—117)

This invention relates to bodies for automobile vehicles and has for its object broadly stated to provide an improved construction of convertible body, that is to say a body which may be converted into an open body or a closed body.

Numerous constructions of folding or collapsable hoods have been proposed to be employed in connection with such bodies in order that they may be so converted.

The folding or collapsable hood may possess advantages from certain points of view, but on the other hand it presents many disadvantages in consequence for instance of the complicated operations called for in raising the hood and the difficulty of stowing it when lowered.

That there is a demand for a convertible body and particularly one which when in the closed state resembles a saloon, is evidenced by the popularity of the drop head coupe.

The invention relates particularly to vehicle bodies of the kind having a boot located behind that portion which provides seating accommodation, comprising a non-collapsable or foldable head including a roof and rear panel, each of dished formation, or in other words provided with side flanges mounted on the body so as to be capable of being moved into a forward position to form with a front screen and side screens a closed body and into a rearward and downward position in which the side flanges of the head will seat upon or engage against portions of the body which in profile correspond with the profile of the side flanges, that is to say the line forming the lower edges of the side flanges.

Preferably in accordance with the invention means is provided for imparting a limited degree of downward motion to the head as it is brought into its fully forward position and a limited increase of downward motion and inward or forward motion to it as it approaches the rearward position in order in the latter case to bring the side flanges into the position in which they seat firmly on the boot and to ensure that at intermediate positions there is a clearance between the side flanges and the adjacent surfaces of the boot.

In most, if not in all cases, initially in the operation of moving the head upward and in a forward direction, that is into the "closed" position, the rate of upward movement initially must be greater than that of the forward motion with a subsequent reduction of the rate of movement in an upward direction relative to the rate of movement in a forward direction and in the preferred arrangement a limited degree of downward movement of the forward portion of the head at least as the head approaches its extreme forward position, motion of the reverse characters being imparted to the head in the reverse order in lowering it on to the boot.

One feature of the invention is the provision of means to impart such motion to the head.

As the present trend of taste in automobile vehicle body design is to require that the boot of the car is inclined inward in a forward direction from the base and outer end, being either formed by intersecting planes or more usually by arcuate or curved portions which give the boot in longitudinal section a form more or less closely corresponding with a segment of an ellipse whose major axis is generally in the fore and after direction of the body, the means for imparting motion to the head is of a character adapted to secure substantially throughout the movement imparted to the head from its lowered position, motion in a forward direction in addition to motion in an upward direction.

Preferably, in accordance with the invention adjacent to each of the sides of the head such that they will be concealed from view by the head when it is raised, there are provided struts adapted to be extended in an upward direction in imparting motion to the head in raising it and forming a support for the head as it is moved in a forward direction, the roof extending when moving forward in cantilever fashion from the struts, while adjacent to the lower and outer end of the head there are provided runners or trolleys engaging in guides or tracks provided on and conforming with the face of the boot.

Conveniently in accordance with the invention the means for imparting motion to the head comprises a cam or cams co-operating with the struts or each of them to impart motion thereto in causing the ends thereof in engagement with the head to be raised and lowered and endless chains adapted to impart motion to the trolleys or runners located adjacent to the rear and lower extremity of the head.

The cam or each of them may be arranged to move in a rectilinear path being for instance guided by V rollers and for imparting such motion to the cams any appropriate means may be employed, for instance the cams may be arranged to be moved manually, by an electric motor or through a reduction gear comprising for instance a screw-threaded shaft engaging a nut associated with a cam.

Preferably however hydraulic means is employed for imparting motion to the cam or cams and also to the trolleys or runners.

The cam may be arranged in association with a cam follower connected with a short rack which through a pinion and gear wheel transmits motion to the struts which are also provided with rack teeth engaging a gear wheel so as to increase the upward or outward motion imparted to the upper ends of the struts and thus to increase their effective length in for instance a ratio of 3:1 with respect to the motion imparted to the cam follower.

The cam and the mechanism in question may be confined to one side of the car boot in which case the gear wheel referred to may be duplicated on the other side of the car boot and being engaged with the first-mentioned gear wheel by a cross-shaft.

On each end of this cross shaft there may be provided simple universal couplings to take up misalignment and to allow for "weaving" of the whole body when the car is in position.

Further, one of these couplings may incorporate or be associated with means for permitting angular or rotary adjustment between the two gear wheels to secure synchronisation of their rotation and thus to secure adjustment of the struts relatively one to the other so that their upper ends are at the same height.

For imparting motion to the trolleys or runners associated with the head there is conveniently employed an endless chain, one adjacent to each side of the boot, which may be of the roller or rocker joint type running over suitably disposed sprockets at fixed positions in the boot and over a sprocket on a shaft on which there is provided a spur wheel engaging a rack formed in one with or secured to the cam.

The chains are preferably further guided by arranging them to run along the bottom of the track in which the runners or trolleys are guided and with each of the chains there is provided a jockey sprocket.

As will be understood the relation between the movement secured by the cam and that secured by movement of the chains must be such that the upward motion imparted to the struts must bear a fixed relation corresponding with the motion imparted to the trolleys or runners and these may comprise rollers having curved or V peripheral faces engaging in channel members of like formation secured on or provided in the boot.

Rollers are provided on the strut elements engaging correspondingly formed channel members associated with the roof portion of the hood, the rollers being for instance frusto-conical or substantially so and the channels being formed with correspondingly shaped internal faces.

The channels extend longitudinally to the roof portion of the head, the channel on one side being connected with the channel on the other side by a cross member, the outer profile of which determines the form in cross section of the head which may be closed with an aluminium skin pulled on to a light steel frame, the bottom edge of which may be formed by a steel tube and strip secured to the cross-members and designed to engage between it and the edge of the skin which is preferably taken about a rod which may be sectionalized and extends from the forward portion of the head to the rearward portion thereof and then downward to the base of the head, a flange provided on a length of rubber tubing adapted to be deformed and thus form when the head is erected a weather-tight joint or weather seal with the adjacent edges of the windows and with the skin of the boot when lowered.

The channels provided in the head may be dimensioned so that when the head is fully erected the rollers on the struts will be disengaged from them and to facilitate their re-engagement in lowering the head the rear ends of the channels may be opened out or splayed.

When so disengaged and when as is preferred the centre of the forward end of the head is engaged with locating and securing means provided at a corresponding position on the upper portion of the wind screen frame, the head will in effect have a three point suspension or connection with the body.

The locating and securing means may be a spigot adapted to enter a recess in the forward portion of the head, the spigot being preferably tapered.

The spigots and the recess are preferably tapered, the latter being conveniently a taper bored bush soft rubber bonded to the forward portion of the head so that it may move not only laterally but axially.

Further to ensure a weather-tight joint between the forward portion of the head and the corresponding portion of the windscreen frame, the upper member of the windscreen frame may be formed to provide a weather joint with the foremost transverse member of the head and to provide a seating therefor adapted to prevent displacement of the head if undue pressure were applied to it.

Thus this member of the windscreen frame may be provided with a ledge or lip against which a correspondingly formed element on the foremost transverse member of the head will seat and form a labyrinthine joint of such character as to promote the draining of any water entering at the junction between the head and the windscreen frame.

At this point it may be again remarked that the limited degree of downward motion of the head as it approaches its final erect position due for instance to the shape of the cam or cams promotes the securing of a weather-tight joint which may further be promoted by the provision of a rubber tube type jointing material similar to that provided on the sides of the head.

As above stated, manually, electrically or hydraulically operated mechanism may be provided for raising and lowering the head.

Thus there may be employed a self-contained electric motor adapted through mechanical means to impart motion to the head or such a motor may be arranged with a driving pump in a hydraulic system or the pump may be arranged to be actuated by an engine or manually.

In the latter case a hydraulic hand pump may be arranged between the two front seats so that it may be operated by the driver or passenger when seated in the vehicle and connected with a hydraulic ram adapted where a cam is provided for raising and lowering the head struts to impart motion to the cam.

The pump may as its main structural feature comprise means ensuring that for a substantially constant effort on the operating handle it generates any pressure demanded of it by an opposing resistance, and to this end means may be provided for automatically adjusting or compensating the mechanical advantage of the handle over the pumping cylinders; in other words the displacement of the pump may be arranged to vary inversely with the pressure or load against which it is operating.

Thus the fulcrum of the lever may be arranged to be displaced by increase in pressure in order to reduce the ratio between the lengths of two arms of the lever.

Preferably the pump is arranged to be double acting and it may be associated with an oil reservoir suitably positioned in the body of the car and for instance adjacent to the dashboard and designed to make up any loss of oil in the hydraulic system which is a fixed or continuous one in the sense that oil leaving the pump is normally replaced by oil returning to it.

In the connection between the pump and the ram there is provided a selector valve and the ram is preferably arranged to retract when the head is being raised and extend when the head is being lowered.

A preferred construction in accordance with the invention is illustrated by way of example with reference to the accompanying drawings, in which:

Figure 1 is a fragmentary view in elevation;

Figure 2 a corresponding plan view;

Figure 3 a similar view in end elevation of a body in accordance with the invention with the head in the raised position;

Figures 4, 5 and 6 being corresponding views with the head in the lowerd position;

Figure 7 is a view in elevation showing certain of the mechanical details;

Figure 8 being a corresponding view on a plane indicated by the line A—A of Figure 7;

Figure 9 being a corresponding view with the head in the up position;

Figure 10 being a plan view in section on a plane indicated by the line B—B of Figure 7;

Figure 11 a plan view showing certain of the elements;

Figure 16:
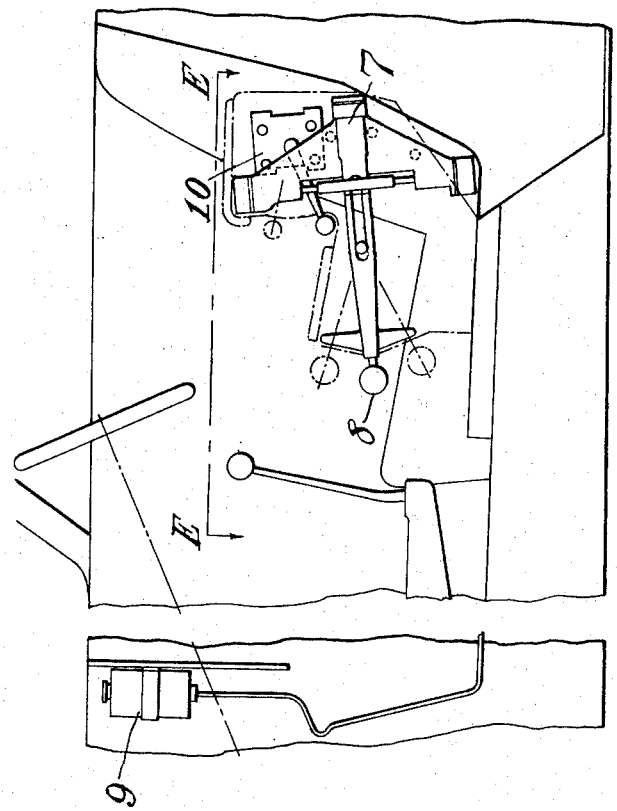
Figure 16 is a view in sectional elevation of the forward part of the body showing means for imparting motion to the head in raising it.
Figure 17:
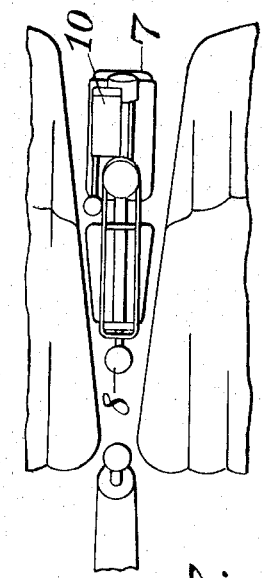
Figure 12:
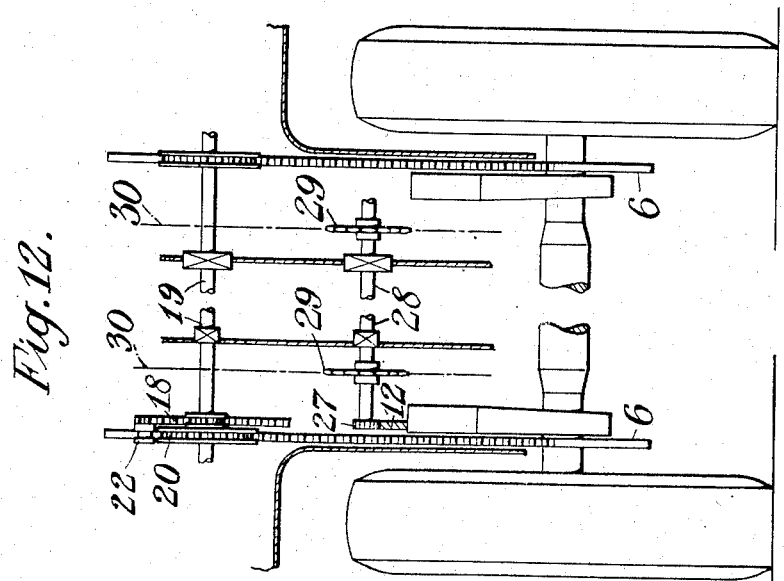
Figure 12 is a view in end elevation corresponding generally with Figure 7.
Figure 15:
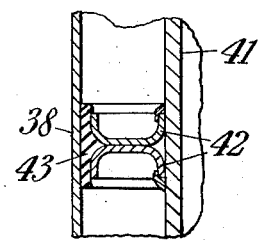
Figure 15 is a fragmentary view in section on planes indicated by the line X—X of Figure 13.
Figure 18:
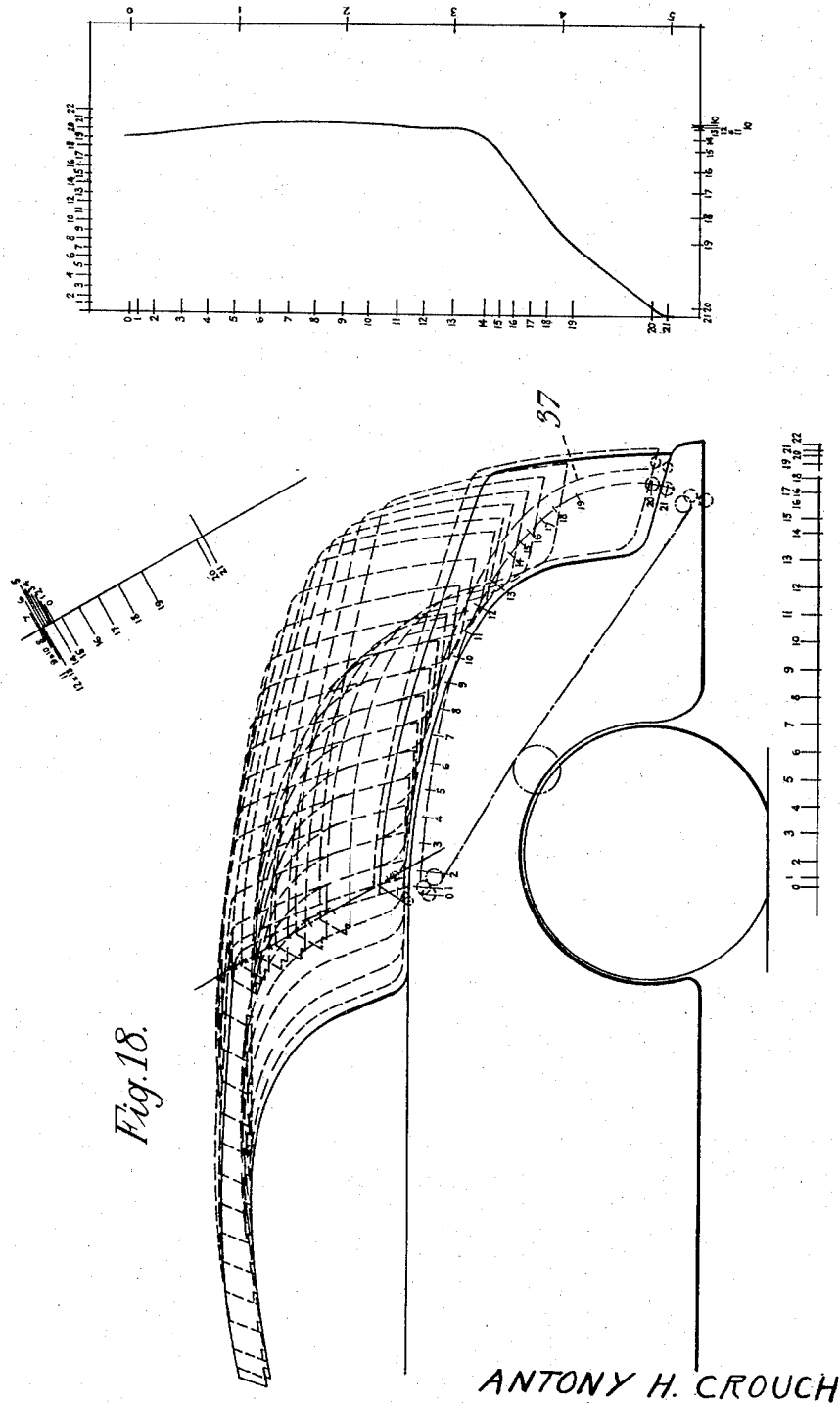

Figure 17 being a sectional plan view on the planes indicated by the line E—E of Figure 15;

Figure 18 showing the positions assumed by the head in the operation of raising and lowering it.

Referring to the drawings, on the body 1 of the vehicle there is provided a head 2 the lower edge 3 of which conforms with the upper face 4 of the boot 5 or tail of the body.

Adjacent to the sides of the body, in a position such that they will be concealed from view by the head when it is raised, there are provided struts 6 adapted to be extended in an upward direction in imparting motion to the head in raising it and forming a support for the head as it is moved forward, the roof portion of which extends when moving forward in cantilever fashion from the struts.

The means for imparting motion to the head in raising and lowering includes an hydraulic pump 7 which, as shown, is double acting and is actuated by a hand lever 8 the pump delivering liquid, the supply of which is made up from the reservoir 9 by way of a reversing valve 10 either in the direction to raise the head or to control its lowering, the pump being connected to a ram 11 adapted to exert thrust on a cam 12 situated on the near side of the boot which is guided and supported by V-groove rollers 13. With this cam co-operates a cam follower 14 which is also V-grooved and consequently helps to restrain the cam from sidewise motion.

The cam follower is connected by an arm 15 with a rack 16 which is engaged on its forward side by two V-rollers 17 running in a groove in the back of the rack and at the front side by a pinion 18 which is shrouded, provided with side or end plates projecting beyond the tips of its teeth and engaging with the sides of the rack.

The pinion is connected to a spindle 19 on which is mounted a gear wheel 20 the pinion and gear wheel transmitting and increasing by 3:1 the motion imparted to the struts 6.

The spindle 19 extends across the body and is furnished with a gear wheel equivalent to 20 engaging the other of the struts.

In this cross-shaft adjacent to each end there is preferably provided a simple universal coupling to take up misalignment and to allow for "weaving" of the whole body when the car is in motion, and one of these couplings preferably incorporates means for providing adjustment so as to be able to align the structure relatively to each other.

The strut at the near side is engaged by a grooved roller 22 carried by the rack, the object of this arrangement being that the one supports the other in the event of excessive side load conditions occurring.

The struts on both sides are guided by two further V-rollers 23, on the front sides or edges the gear wheels 20 operating also to retain them in position, the wheels being furnished with side or end plates or discs engaging the sides of the strut.

In addition the struts are engaged or guided by further pinions 24.

The tops of the struts are formed with rearwardly extending portions 25 to enable the front of the head to be kept outside the rear seat headroom space when nearing the lowering cycle (the struts proper have to move forward in raising the head so that they can come through the top of the waist of the body within the rear bottom edge of the head).

The cam 12 is furnished with a rack 26 engaging a pinion 27 secured to a shaft 28 to which is also secured a chain sprocket 29 on one side of the body and a similar chain sprocket on the opposite side of the body, these sprockets engaging chains 30 which are guided in part by sprockets 31 and by channels 32 provided at the sides of the boot.

Figure 13:
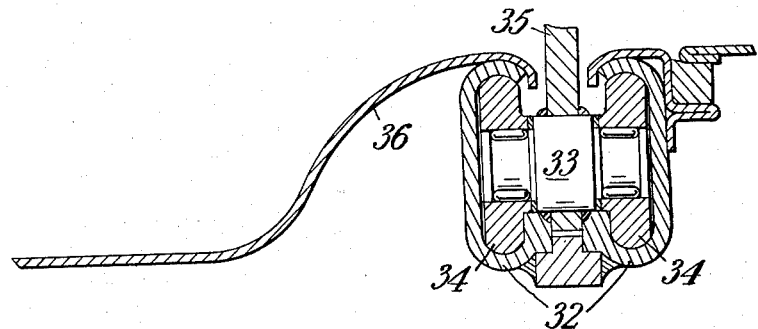
Figure 13 is a fragmentary view illustrating the engagement of the lower rear portion of the head with runners on the boot or tail.

The chains are connected with trolleys 33 these trolleys being furnished, see Fig. 13, with convex faced rollers 34 engaging in the channels referred to and being connected by an arm 35 furnishing a pivotal attachment of the trolleys with the adjacent portion of the head, that is to say, the rear bottom portion thereof.

These channels are sunk, as will be seen, below the skin 36 of the boot, the centre line 37 of these tracks being shown in Figure 18 which shows twenty-two positions the trolleys and the head will successively take up in raising and lowering it, the ends of these channels being inclined so as to effect the pulling down of the head toward the conclusion of the raising and lowering operations.

Figure 14:
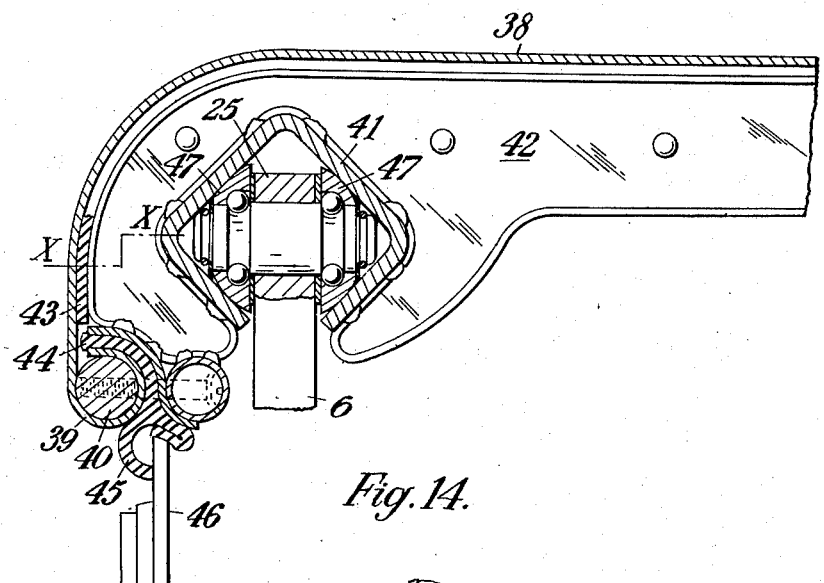
Figure 14 is a fragmentary view in section of the roof of the head.

The head itself, see Figures 14 and 15, comprises an aluminium skin 38 the edge 39 of which forms a bead reinforced by a core 40 which is formed in sections, the sections being secured in position by screws.

This skin is stretched over a framework which comprises two longitudinally extending runners 41 connected at intervals by transverse members 42 which may be made up from thin steel dished pressing riveted or spot welded together as shown in Figure 14 and between this framework and the skin is inserted soft rubber strips 43 and in addition between the edge of the skin and the edge of the framework is inserted a soft rubber packing 44 which is designed to secure a weathertight joint 45 with the adjacent windows 46 or other adjacent parts of the body.

The runners 41 are designed to engage conical rollers 47 provided on the upper ends 25 of the struts 6.

In its final downward or upward motion of the head, these runners become free from the rollers the rear ends of which are splayed out to facilitate the engagement and disengagement of the rollers and the tracks, and in its final forward movement, a conical and inclined recess 48 in the forward part 49 of the head engages the upwardly and outwardly extending pin 50, the inclination of this pin operating to draw the head slightly downwards so as to give a weathertight joint with the upper member 51 of the windscreen 52.

I claim:

1. A vehicle body comprising a riding space, a boot or deck portion rearwardly thereof, a noncollapsible roof or head capable of bodily elevational and longitudinal movement to enclose said riding space and of bodily longitudinal and lowering movement to nest with said deck portion and leave said riding space open, runners or trolleys carried by said roof adjacent its rear and lower extremity, guides or tracks on and conforming with the face of said deck and with which said runners engage, struts underlying the upper and forward portion of said roof when the roof is nested with said deck, said struts being mounted for upward movement for raising said roof and forming a support for said roof as the latter is raised, and said struts being glidingly engaged by said roof as it is moved forwardly to enclose said riding space, said roof being supported by said struts in cantilever fashion as it is gliding forwardly and rearwardly relative to said struts.

2. A vehicle body according to claim 1, in which said roof comprises longitudinally extending channel elements, and in which rollers are carried by said strut elements and are engaged in said channel elements during the lifting and lowering of said roof by said struts and during the gliding of the roof relative to said struts.

3. In a vehicle body comprising a boot or deck and a noncollapsible head, said head being adapted to be moved bodily from a position in which it constitutes the roof of said body to a position in which it rests on said boot or deck and comprising a rear panel and side flanges, the combination thereof with supports for said head extending upwardly from said body and slidably engaging said head to permit fore and aft motion thereof, raising and lowering means for said supports, and guide means constraining a lower rear portion of said head to traverse the upper surface of said boot or deck in a fore and aft direction in moving said head from one of said positions to the other.

4. A vehicle body as set forth in claim 3, wherein said supports comprise struts supporting said head in cantilever fashion, and including guide means constraining said struts to rectilinear motion, and also including driving means for effecting said traversing co-ordinated with said means for raising and lowering said supports.

5. A vehicle body as set forth in claim 4, wherein said means for raising and lowering said supports comprises a cam and cam follower, and said means for effecting said traversing comprises an endless band driven in co-ordination with said cam.

6. A vehicle body as set forth in claim 5, wherein said means for raising and lowering said supports further comprises a rack and gear means transmitting to said supports the motion of said cam follower in a magnified degree.

7. A vehicle body as set forth in claim 6, wherein said head comprises longitudinally extending channel members, and said struts each comprise an upper, turned back portion furnished with a roller and engaged in one of said channel members.

8. A vehicle body as set forth in claim 3, wherein said guide means comprise trolleys depending from a lower rear portion of said head, and channel shaped supporting guides for said trolleys on an upper portion of said boot or deck.

ANTONY H. CROUCHER.

REFERENCES CITED

The following references are of record in the file of this patent:

UNITED STATES PATENTS

| Number | Name | Date |
| --- | --- | --- |
| 1,379,906 | Ellerbeck | May 31, 1921 |
| 1,722,227 | Lukesh | July 23, 1929 |
| 2,051,140 | Grimston | Aug. 18, 1936 |
| 2,105,293 | Paulin | Jan. 11, 1938 |
| 2,303,788 | Carr | Dec. 1, 1942 |

FOREIGN PATENTS

| Number | Country | Date |
| --- | --- | --- |
| 415,376 | Great Britain | Aug. 21, 1934 |
| 448,042 | Great Britain | May 29, 1936 |